United States Patent Office 2,960,480
Patented Nov. 15, 1960

2,960,480

PRODUCTION OF HALOALKYLATED RESIN PARTICLES

Lawrence E. Thielen, Villa Park, Ill., assignor to Nalco Chemical Company, a corporation of Delaware No Drawing. Filed Mar. 13, 1957, Ser. No. 645,668

6 Claims. (Cl. 260—2.1)

This invention relates to the production of haloalkylated resin particles especially adapted for the production of anion exchange resin particles. The anion exchange resin particles produced by the new process are characterized by increased porosity or water-holding capacity and have the desired characteristics for a porous high capacity anion exchange resin.

The invention is concerned with the class of anion exchange resins which are the reaction products of ammonia or amines with a vinyl aromatic resin having haloalkyl groups attached to the aromatic nuclei in the resin. Certain of the procedures and materials employed in the new process are analogous to those previously employed for producing anion exchange resins of the class, and the following description of the prior process is also applicable to the invention.

The vinyl-aromatic resins employed as starting materials are the normally solid benzene-insoluble copolymers of monovinyl aromatic monomers, and polyvinyl-aromatic comonomers, which copolymers contain from 0.5 to 40, preferably from 0.5 to 20 percent by weight of a polyvinyl-aromatic monomer chemically combined, i.e., interpolymerized with a monovinyl-aromatic comonomer, in a predominant proportion, preferably 60–99.5 percent, and further preferably 80 to 99.5 percent.

The monovinyl-aromatic compounds are preferably selected from the benzene and naphthalene series, i.e. they contain not more than 10 carbon atoms in the aromatic nucleus, which monovinyl-aromatic compounds may contain in addition to the vinyl radical, from 1 to 3 halogen or lower alkyl radicals other than a tertiary alkyl radical, attached to the aromatic nucleus. The alkyl substituents are preferably methyl radicals. Examples of such monovinyl-aromatic compounds are styrene, ar-methylstyrene, ar-dimethylstyrene, ar-ethylvinylbenzene, ar-chlorostyrene, vinylnaphthalene, ar-methyl-vinylnaphthalene, ar-sec.-butylstyrene and ar-trimethylstyrene. The polyvinylaromatic compounds are also selected from the benzene and naphthalene series. Examples of polyvinyl-aromatic compounds are divinylbenzene, ar-divinyltoluene, ar-divinylxylene, divinylnaphthalene and ar-divinyl-ethylbenzene.

The monovinyl and polyvinyl aromatic compounds are further preferably benzenoid compounds, that is, those structurally related to benzene and including, for example, the monovinyl and polyvinyl compounds of benzene, alkylbenzene, halobenzene and the like, the substituents on the benzene ring being inert in the polymerization and subsequent reactions in the production of anion exchange resins.

The copolymers may be prepared by any of the usual methods employed to polymerize monomeric vinyl type compounds. For instance, a mixture containing divinylbenzene and a monovinyl-aromatic compound, e.g. styrene, may be polymerized in mass, or in the presence of a dispersion medium for the monomers by the use of heat, light or heat and light, in the presence or absence of a polymerization catalyst and at atmospheric, subatmospheric or superatmospheric pressure.

Suitable catalysts for effecting polymerization of the monomers are the peroxides such as benzoyl-peroxide, lauroyl peroxide, hydrogen peroxide, etc. Per-compounds such as potassium persulfate, sodium perborate, and ammonium persulfate may also be employed as polymerization catalysts.

The polymerization reaction is preferably carried out in aqueous dispersion, at temperatures of from 75° to 100° C., employing a peroxide, e.g., benzoyl peroxide, as catalyst. Usually, a protective colloid such as starch, sodium cellulose glycolate, hydroxyethylcellulose, methylcellulose, etc., in amounts corresponding to from 0.1 to 0.5 percent by weight of the monomers used, is added to the aqueous dispersion to aid in maintaining the monomers dispersed as droplets while polymerizing the same to solid hard granules or beads. The beads are commonly obtained in particle sizes ranging in large part from 5 to 325 mesh.

The copolymer is separated from the aqueous dispersion, washed with water and dried, e.g., by heating in a current of hot air, or by other usual methods. When not obtained in bead form, the polymeric product may be crushed, ground, broken or otherwise reduced to a powdered or granular form.

The copolymers are normally solid benzene-insoluble vinyl-aromatic resins. By reacting the resins with at least a stoichiometric quantity, and preferably an excess, of a haloalkylating, preferably halomethylating agent such as chloromethyl methyl ether or bromoethyl methyl ether in the presence of Friedel-Crafts type catalyst such as zinc chloride, zinc oxide, stannic chloride, aluminum chloride, tin, zinc, iron, etc., halomethyl radicals may be introduced into the nuclei of the resin.

The halomethylation reaction, which occurs readily at temperatures in the range of from $-10°$ to $120°$ C., or higher, is carried out while the copolymer is swollen by, or dispersed in, an organic liquid, e.g., tetrachloroethylene or chlorobenzene, which liquid is less reactive with the halomethylating agent than is the polymer, or an excess of the halomethylating agent over the stoichiometric quantity for the desired amount of substitution. About 0.1 to 2 mols of catalyst, preferably 0.5 to 1.5 mols, are employed per mol of copolymer (calculated on the average molecular weight of the monomers). The reaction is advantageously carried to a point at which the resin product contains an average of at least one halomethyl radical per five aromatic nuclei and is usually continued until the product contains an average of from 0.8 to 1.2 halomethyl groups per aromatic nucleus.

After completing the halomethylating reaction, the resin is separated, e.g., by filtration, and washed with water, or preferably is washed successively with an organic liquid such as acetone or ethyl alcohol and then washed with water. The halomethylated resin can be used directly in wet condition or in dried condition, as an agent for preparation of the anion exchange resins.

The haloalkylated resins thus obtained are, therefore, water and benzene-insoluble, aromatic, cross-linked vinyl copolymers containing nuclear substituent groups having the general formula $-C_nH_{2n}-X$ wherein X is halogen, preferably chlorine or bromine, and $n$ is an integer of preferably 1 to 4.

Haloalkylated resins are reacted with ammonia or primary, secondary, or tertiary amines to produce the insoluble anion exchange resins. Weakly basic resins are prepared from ammonia and the primary and secondary amines. Examples of such amines are methylamine, dimethylamine, N-butylamine, dibutylamine, isobutylamine, aniline, benzidines, toluidines, xylidines, alpha and beta naphthalene amines, naphthalene diamines, benzylamine, dibenzylamine, ethylenediamine, cyclohexylamine, dicyclohexylamine, diethylenetriamine, triethylenetetramine, tetraethylenepentamine, propylenediamine, dipropylenetriamine, and homologues thereof.

A preferred class of anion exchange resins in the invention constitutes the strongly basic quaternary ammonium resins, produced by reacting tertiary amines with the haloalkylated resins. Examples of suitable tertiary amines are trimethylamine, triethylamine, tributylamine, dimethyl propanolamine, dimethyl ethanolamine, methyl diethanolamine, 1-dimethylamino-2,3-propanediol, dioctyl ethanolamine, and homologues thereof.

The amines are thus preferably aliphatic, especially alkyl and alkanol, carbocyclic, and heterocyclic amines. The preferred tertiary amines are further preferably at least mono-alkyl N-substituted, and may contain one or more alkanol, including alkanediol, groups.

The proportion of the amine employed relative to the vinyl-aromatic resin reactant having haloalkyl radicals attached to its aromatic nuclei, should be such that there is present in the reaction mixture at least one molecular proportion of the amine for each haloalkyl radical in the vinyl-aromatic resin. The amine may be used in excess of the minimum proportion just stated. Usually, from one to three molecular proportions of the amine are used per haloalkyl radical in the vinyl-aromatic resin.

The amination, i.e., the reaction of the amine with the vinyl-aromatic resin having haloalkyl radicals attached to its aromatic nuclei, may be carried out at temperatures of from 20° to 150° C., preferably from 20° to 100° C. in the presence or absence of a dispersing medium and at atmospheric, subatmospheric or superatmospheric pressure. The reaction is usually carried out by dispersing the granular vinyl-aromatic resin having haloalkyl radicals attached to its nuclei in a mixture of the amine and a liquid such as water, acetone, ethyl alcohol, etc., and heating the mixture to a temperature of from 70° to 100° C. for a period of 2 to 6 hours or longer, or reacting at room temperature.

It is often desirable to include a catalyst for the reaction, among which are cupric iodide, potassium bromide, calcium iodide, cuprous chloride, and potassium iodide, but a catalyst is not required.

The reaction product, i.e., the anion exchange resin, is separated from the reaction mixture, e.g. by filtering, and is washed with water, or preferably washed with an organic liquid such as acetone, ethyl alcohol or dioxane, then washed with water to remove any soluble components, e.g., unreacted amine.

The present invention is concerned with resins of the type described above. However, the vinyl-aromatic resins, before haloalkylation, are first subjected to a second polymerization within the resins. A mixture of monomers is polymerized in the interstices of the resin particles, which procedure is referred to as "double polymerization" or "repolymerization." Only thereafter is the resin haloalkylated, and this step is followed by amination. Both the haloalkylation and the amination proceed according to the methods previously employed in the production of single polymer beads or granules.

The process of double polymerization is described in British Patent 728,508, published April 20, 1955. In this process, resin particles are impregnated with or caused to imbibe a polymerizable mixture of monomers, which may be the same mixture as employed in the production of the initial copolymer, or a different mixture. The second mixture of monomers is caused to polymerize within the interstices of the copolymer particles, under generally the same conditions as employed for the initial formation of copolymer particles. The process of the patent is characterized by first producing particles of a copolymeric resin, then haloalkylating the copolymer, then effecting the second polymerization within the resin particles, and then treating the second polymer to provide ionic groups thereon.

It has been found in the present invention that when this method is attempted in the production of an anion exchange resin, the resin beads are too soft and unsuitable as commercial granular ion exchange resins. Very surprisingly, it has been found that by eliminating the haloalkylation prior to the second polymerization, and first haloalkylating the polymers after the second polymerization, the properties of the beads or granules are much improved. It was also found that at the same time, the important advantage is achieved of increasing the porosity of the resin while providing a high capacity exchange resin. The haloalkylated resin is especially important for production of porous, high capacity, strong base anion exchange resins.

The new process of the invention therefore involves impregnating particles of a resinous copolymer of a monovinyl aromatic compound and a polyvinyl aromatic compound, with a monomeric mixture of a monovinyl aromatic compound and a polyvinyl aromatic compound, polymerizing the monomeric mixture in the copolymer particles, and thereafter haloalkylating the product. The haloalkylation is followed by amination, to produce an anion exchange resin.

Proceeding according to the invention, a copolymeric vinyl aromatic resin is produced as described above, preferably directly in granular form, or by granulating a mass of the resin. The polymerization is conducted to substantial completion, producing a resin copolymer having a molecular weight of, e.g., about 50,000 or greater. The resin particles are preferably washed and dried. The resin particles are then impregnated with a monomeric mixture of the copolymerizable vinyl compounds, which may be the same as or different from the polymerizable mixture employed in the production of the initial resin, in components, proportions, and resulting degree of cross-linking.

For the particles of the initial copolymer to remain as individual particles, an excess of the monomeric liquid is avoided during the second polymerization. In the event that the monomeric liquid mixture is not readily imbibed by the copolymer particles, or when it is desired to introduce a relatively small quantity of the monomeric liquid, the mixture of monomers may be diluted with an inert liquid which is easily imbibed. The diluent may be removed after polymerization by appropriate treatment such as heating.

The quantity of liquid which may be imbibed by a copolymer is increased by decreasing the degree of its cross-linking and vice versa. The quantity of monomeric mixture employed for the second polymerization and the degree of cross-linking for each of the resins may be selected to provide the appropriate characteristics in the resulting doubly polymerized resin. Thus, with higher initial cross-linking the monomeric mixture may provide a lower degree of cross-linking, or the reverse conditions may obtain. The advantages of the invention are apparently most pronounced when the initial polymerizable mixture and the second polymerizable mixture are about the same, and they each result in a relatively low degree of cross-linking, to provide a high porosity and relatively low density.

The second polymerization is carried out by maintaining discrete particles of the copolymer containing imbibed liquid, and employing conditions like those provided for the direct production of the initial copolymer in the form of resin particles. Thus, the second polymerization is carried out with the particles in an aqueous mixture or suspension thereof, at about the same temperature and for about the same length of time, e.g., at about 75° C. to 100° C., in the presence of a polymerization catalyst, and for a length of time sufficient to substantially complete the polymerization, which is ordinarily several hours or more.

The haloalkylation may be carried out as described above for the prior haloalkylation of the particles consisting of a single copolymer. The quantities of reagents are then calculated in known manner on the basis of the total weight of both polymers. Amination is likewise carried out according to the prior procedures described above, to convert the haloalkyl groups to aminoalkyl groups. The resulting resin is then used in anion exchange processes in the conventional manner.

The following examples illustrate preferred embodiments of the invention, but it is to be understood that the invention is not limited to the materials, proportions and procedures given therein. The proportions are by weight unless otherwise specified.

EXAMPLE 1

2% divinylbenzene (DVB)–96% polystyrene–2% ethylvinylbenzene beads were prepared in the standard manner by suspension polymerization, as follows. Into a 2 liter, 3-necked flask, fitted with a mechanical, (paddle stirrer and an air condenser, were placed 900 cc. of de-ionized water which was heated to about 85° C. 10 grams of "soluble" potato starch, which had already been stirred into 100 cc. of room temperature water, were added with stirring. Next was added, all at once, a clear monomer solution of 96 g. of styrene, 4 g. of 50–55% divinylbenzene (in which the remaining 45–50% is essentially ethylvinylbenzene, with a small amount of diethylbenzene and high-boiling compounds), and 1 g. of dibenzoyl peroxide. Alternatively, 2 g. of pure DVB and 98 g. of styrene may be added for the production of 2% DVB–98% polystyrene beads having the same characteristics.

After addition, heating at 85° C. was continued for about one hour with stirring. Gelation occurred in about an hour, and thereafter, stirring and heating at 85° C. was continued for six hours or more. On cooling, the bulk of the aqueous phase was decanted. Fresh water was added, stirred and subsequently decanted, until practically all of the starch was washed or diluted out and filtration was easy. The beads were filtered, washed with water, and air-dried, and lastly screened to give 20–50 mesh beads.

EXAMPLE 2

The resin beads of Example 1 were treated with the same mixture of monomers, for a second polymerization within the beads. For impregnation, a solution of the styrene–DVB monomers, plus dibenzoyl peroxide was prepared, and the beads were allowed to imbibe an equal weight of the solution quantitatively, by mixing in equal proportions. The second polymerization was then carried out in the same manner as the original bead formation, placing the impregnated beads in water containing starch, and heating with stirring at 85° C. for six hours or more.

After water-washing and air-drying, chloromethylation was accomplished by immersing the beads in excess chloromethyl methyl ether (30 g. beads for 100 cc. of the ether) as the solvent, cooling to about 0° C., and adding anhydrous aluminum chloride powder in portions (23 g. over approximately one-half hour, so the temperature was around 10° C.). After the addition, the reaction was completed with either room temperature (25° C.) stirring or stirring at reflux (55° C.). The beads were separated from the solvent, and then washed with alcohol, followed by water.

Amination or quaternization was carried out at room temperature by placing for example, 220 g. of chloromethylated beads in 150 cc. of methylethylketone (or acetone), and then adding 600 cc. of 25% aqueous trimethylamine. The mixture was allowed to react overnight, about 15 hours. It was then diluted with water and filtered, and the beads were washed with methylethylketone (or alcohol) and then water. Filtration and air-drying can also be accomplished depending on the ultimate use of the product.

Two quantities of anion exchange resin beads which were separately produced according to the foregoing procedure are identified as Nos. 1 and 2 in the table following, where they are compared with other anion exchange resins. The anion exchange resin identified as No. 3 was prepared in the foregoing manner, except that the initial copolymer was a comparable commercial resin of a copolymer of styrene and 2% divinylbenzene. Resin No. 4 was a comparable commercial anion exchange resin of styrene and 2% divinylbenzene, prepared in the conventional manner, with no second polymerization.

Resins Nos. 5 and 6 were prepared in the manner of British Patent 728,508, i.e., the product of the above Example 1 was next chloromethylated in the manner set forth as part of this second example, followed by the complete procedure of this example. Thus, the initial copolymer was chloromethylated, and the doubly polymerized product was again chloromethylated. This material was lastly aminated or quaternized.

Table
COMPARISON OF ANION EXCHANGE RESINS

| Resin No. | Water-holding capacity, percent | Total capacity, meq./gm. | Salt-splitting capacity, meq./gm. | Chloromethylation conditions |
| --- | --- | --- | --- | --- |
| 1 | 57.1 | 4.39 | 4.34 | 15 hrs., 25° C. |
| 2 | 58.3 | 4.21 | 4.13 | 2 hrs., 55° C. |
| 3 | 57.1 | 4.27 | 4.24 | 15 hrs., 25° C. |
| 4 | 56.4 | 4.63 | 4.39 | |
| 5 | 55.0 | 3.62 | 3.59 {1st / 2nd} | 4 hrs., 25° C. / 2.5 hrs., 25° C. |
| 6 | 56.0 | 3.66 | 3.63 {1st / 2nd} | 4 hrs., 25° C. / 2.5 hrs., 25° C. |

Resin Nos. 5 and 6, prepared according to the prior procedure, were definitely too soft to be of any value as commercial ion exchange resin beads. On the other hand, resin Nos. 1 to 3 according to the invention possessed satisfactory hardness characteristics.

It will also be observed from the foregoing table that resin Nos. 1 to 3 produced according to the invention were characterized by desirably increased porosities over resin No. 4, which represents a widely used commercial resin. Resin Nos. 5 and 6 had lower porosities.

The exchange capacities and salt-splitting capacities of the new resins were good for high capacity anion exchange resins. The capacities of resin Nos. 5 and 6 were substantially lower.

When the example was repeated with the imbibition of a quantity of monomer mixture equal to one-half the weight of the beads, instead of an equal weight, the porosity was again increased, although not so greatly, and the capacities were likewise good.

It is generally preferable to employ a quantity of about one-half to one and one-half parts by weight of the mixture of monomers per part of copolymer beads. This quantity will vary with the degree of cross-linking of the resin and with that provided by the monomer mixture. It is also generally preferred that both the initial copolymer and the monomer mixture for the second polymerization contain a quantity of cross-linking polyvinyl-aromatic compound in the range of about 0.5% to 8% by weight of the respective monomer mixtures or copolymers resulting therefrom. A proportion of about 0.5% to 2% of polyvinyl compound is further preferred, for producing high porosity and low density anion exchange resins. Denser resins of lower porosity are obtained by increasing the proportion of polyvinyl compound.

The invention thus provides a new and improved process for producing haloalkylated resin particles especially suited for the production of anion exchange resins. The process overcomes prior disadvantages while increasing the porosity of the resin product and retaining other desired characteristics of porous, high capacity anion exchange resin.

The invention is hereby claimed as follows:

1. The process for producing halomethylated resin particles adapted for the production of anion exchange resin particles therefrom which comprises, in proportions by weight, providing particles of a normally solid water and benzene-insoluble cross-linked aromatic hydrocarbon copolymer of monomers consisting of about 98% to 99.5% of a monomer selected from the group consisting of styrene and styrene containing from 1 to 3 lower alkyl radicals attached to the aromatic nucleus, and about 0.5% to 2% of a monomer selected from the group consisting of divinylbenzene and divinylbenzene containing from 1 to 2 lower alkyl radicals attached to the aromatic nucleus, impregnating said hydrocarbon copolymer particles with about ½ to 1½ parts per part of said particles, of a mixture of monomers consisting of about 98% to 99.5% of a monomer selected from the group consisting of styrene and styrene containing from 1 to 3 lower alkyl radicals attached to the aromatic nucleus, and about 0.5% to 2% of a monomer selected from the group consisting of divinylbenzene and divinylbenzene containing from 1 to 2 lower alkyl radicals attached to the aromatic nucleus, said mixture of monomers having dissolved therein a polymerization catalyst, polymerizing said monomeric mixture in said hydrocarbon copolymer particles while suspending the particles in an aqueous medium, to a normally solid water and benzene-insoluble cross-linked aromatic hydrocarbon copolymer of said last-named monomers, and thereafter halomethylating the resulting mixed resin product by reacting it with at least a stoichiometric quantity for monosubstitution of the aromatic nuclei, of halomethyl methyl ether and about 0.5 to 1.5 mols of aluminum chloride per mol of monomer content of said product.

2. The process for producing chloromethylated resin particles adapted for the production of anion exchange resin particles therefrom which comprises, in proportions by weight, providing particles of a normally solid water and benzene-insoluble cross-linked aromatic hydrocarbon copolymer of monomers consisting of about 98% to 99.5% of styrene and about 0.5% to 2% of divinylbenzene, impregnating said hydrocarbon copolymer particles with about ½ to 1½ parts per part of said particles, of a mixture of monomers consisting of about 98% to 99.5% of styrene and about 0.5% to 2% of divinylbenzene, said mixture of monomers having dissolved therein a polymerization catalyst polymerizing said monomeric mixture in said hydrocarbon copolymer particles while suspending the particles in an aqueous medium, to a normally solid water and benzene-insoluble cross-linked aromatic hydrocarbon copolymer of said last-named monomers, and thereafter chloromethylating the resulting mixed resin product by reacting it with at least a stoichiometric quantity for monosubstitution of the aromatic nuclei, of chloromethyl methyl ether and about 0.5 to 1.5 mols of aluminum chloride per mol of monomer content of said product.

3. The process for producing chloromethylated resin particles adapted for the production of anion exchange resin particles therefrom which comprises, in proportions by weight, providing particles of a normally solid water and benzene-insoluble cross-linked aromatic hydrocarbon copolymer of monomers consisting of about 98% to 99.5% of styrene and ethylvinylbenzene, and about 0.5% to 2% of divinylbenzene, impregnating said hydrocarbon copolymer particles with about ½ to 1½ parts per part of said particles, of a mixture of monomers consisting of about 98% to 99.5% of styrene and ethylvinylbenzene, and about 0.5% to 2% of divinylbenzene, said mixture of monomers having dissolved therein a polymerization catalyst, polymerizing said monomeric mixture in said hydrocarbon copolymer particles while suspending the particles in an aqueous medium, to a normally solid water and benzene-insoluble cross-linked aromatic hydrocarbon copolymer of said last-named monomers, and thereafter chloromethylating the resulting mixed resin product by reacting it with at least a stoichiometric quantity for monosubstitution of the aromatic nuclei, of chloromethyl methyl ether and about 0.5 to 1.5 mols of aluminum chloride per mol of monomer content of said product.

4. The process for producing chloromethylated resin particles adapted for the production of anion exchange resin particles therefrom which comprises, in proportions by weight, polymerizing a mixture of monomers consisting of about 98% of styrene and about 2% of divinylbenzene in suspension in an aqueous medium, to produce particles of a normally solid water and benzene-insoluble cross-linked aromatic hydrocarbon copolymer of said monomers, impregnating said hydrocarbon copolymer particles with about ½ to 1½ parts per part of said particles, of a mixture of monomers consisting of about 98% of styrene and about 2% of divinylbenzene, said mixture of monomers having dissolved therein a polymerization catalyst, polymerizing said last-named monomeric mixture in said hydrocarbon copolymer particles while suspending the particles in an aqueous medium, to a normally solid water and benzene-insoluble cross-linked aromatic hydrocarbon copolymer of said last-named monomers, and thereafter chloromethylating the resulting mixed resin product by reacting it with at least a stoichiometric quantity for monosubstitution of the aromatic nuclei, of chloromethyl methyl ether and about 0.5 to 1.5 mols of aluminum chloride per mol of monomer content of said product.

5. The process for producing chloromethylated resin particles adapted for the production of anion exchange resin particles therefrom which comprises, in proportions by weight, polymerizing a mixture of monomers consisting of about 96% of styrene, about 2% of ethylvinylbenzene, and about 2% of divinylbenzene in suspension in an aqueous medium, to produce particles of a normally solid water and benzene-insoluble cross-linked aromatic hydrocarbon copolymer of said monomers, impregnating said hydrocarbon copolymer particles with about ½ to 1½ parts per part of said particles, of a mixture of monomers consisting of about 96% of styrene, about 2% of ethylvinylbenzene, and about 2% of divinylbenzene, said mixture of monomers having dissolved therein a polymerization catalyst, polymerizing said last-named monomeric mixture in said hydrocarbon copolymer particles while suspending the particles in an aqueous medium, to a normally solid water and benzene-insoluble cross-linked aromatic hydrocarbon copolymer of said last-named monomers, and thereafter chloromethylating the resulting mixed resin product by reacting it with at least a stoichiometric quantity for monosubstitution of the aromatic nuclei, of chloromethyl methyl ether and about 0.5 to 1.5 mols of aluminum chloride per mol of monomer content of said product.

6. The process for producing an anion exchange resin which comprises, in proportions by weight, providing particles of normally solid water and benzene-insoluble cross-linked aromatic hydrocarbon copolymer of monomers consisting of about 98% to 99.5% of a monomer selected from the group consisting of styrene and styrene containing from 1 to 3 lower alkyl radicals attached to the aromatic nucleus, and about 0.5% to 2% of a monomer selected from the group consisting of divinylbenzene and divinylbenzene containing from 1 to 2 lower alkyl radicals attached to the aromatic nucleus, impregnating said hydrocarbon copolymer particles with about ½ to 1½ parts per part of said particles, of a mixture of monomers consisting of about 98% to 99.5% of a monomer selected from the group consisting of styrene and styrene containing from 1 to 3 lower alkyl radicals attached to the aromatic nucleus, and about 0.5% to 2% of a monomer selected from the group consisting of divinylbenzene and divinylbenzene containing from 1 to 2 lower alkyl radicals attached to the aromatic nucleus, said mixture of monomers having dissolved therein an organic peroxide polymerization catalyst, polymerizing said monomeric mixture in said hydrocarbon copolymer particles while suspending the particles in an aqueous medium, to a normally solid water and benzene-insoluble cross-linked aromatic hydrocarbon copolymer of said last-named monomers, thereafter halomethylating the resulting mixed resin product by reacting it with at least a stoichiometric quantity for monosubstitution of the aromatic nuclei, of halomethyl methyl ether and about 0.5 to 1.5 mols of aluminum chloride per mol of monomer content of said product, and aminating the halomethylated product by reacting it with at least one mol per halomethyl radical, of a member selected from the group consisting of ammonia and primary, secondary, and tertiary amines.

References Cited in the file of this patent

UNITED STATES PATENTS 2,591,573   McBurney _____ Apr. 1, 1952

FOREIGN PATENTS 728,508   Great Britain _____ Apr. 30, 1955
785,157   Great Britain _____ Oct. 23, 1957